US011738472B2

(12) United States Patent
Potoradi

(10) Patent No.: US 11,738,472 B2
(45) Date of Patent: Aug. 29, 2023

(54) ARTICULATION FOR A ROBOT

(71) Applicant: Siemens Aktiengesellschaft, Munich (DE)

(72) Inventor: Detlef Potoradi, Saale (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/509,782

(22) Filed: Oct. 25, 2021

(65) Prior Publication Data

US 2022/0126459 A1  Apr. 28, 2022

(30) Foreign Application Priority Data

Oct. 26, 2020 (EP) .................................... 20203784

(51) Int. Cl.
*B25J 19/00* (2006.01)
*B25J 9/10* (2006.01)
*B25J 9/12* (2006.01)
*B25J 13/08* (2006.01)

(52) U.S. Cl.
CPC ........... *B25J 19/0054* (2013.01); *B25J 9/102* (2013.01); *B25J 9/126* (2013.01); *B25J 13/088* (2013.01); *B25J 19/0004* (2013.01)

(58) Field of Classification Search
CPC ....... B25J 9/102; B25J 13/088; B25J 19/0054
See application file for complete search history.

(56) References Cited

U.S. PATENT DOCUMENTS

| 7,775,060 B2 * | 8/2010 | Nakajima | H02K 11/33 |
| | | | 62/505 |
| 2020/0235636 A1 * | 7/2020 | Miyazawa | B25J 9/102 |

FOREIGN PATENT DOCUMENTS

| CN | 207465256 U | 6/2018 |
| CN | 109227599 A | 1/2019 |
| EP | 1 829 651 B1 | 9/2007 |
| JP | S60108292 A | 6/1985 |
| JP | H0655482 A | 3/1994 |
| JP | 2004222428 A | 8/2004 |
| JP | 2009-233824 | * 10/2009 |
| JP | 2010221310 A | 10/2010 |

* cited by examiner

*Primary Examiner* — William C Joyce
(74) *Attorney, Agent, or Firm* — Henry M. Feiereisen LLC

(57) ABSTRACT

An articulation for a robot, in particular a collaborative robot, includes as components a drive, a transducer for providing information relating to a rotational speed, commutation and/or position, and a plurality of heat exchanger tubes for removing heat from the components, with a first one of the heat exchanger tubes touching a first subset of the components, and with a second one of the heat exchanger tubes touching a second subset of the components.

16 Claims, 1 Drawing Sheet

ARTICULATION FOR A ROBOT

CROSS-REFERENCES TO RELATED APPLICATIONS

This application claims the priority of European Patent Application, Serial No. 20203784.2, filed Oct. 26, 2020, pursuant to 35 U.S.C. 119(a)-(d), the disclosure(s) of which is/are incorporated herein by reference in its entirety as if fully set forth herein.

BACKGROUND OF THE INVENTION

The present invention relates to an articulation for a robot.

It would be desirable and advantageous to provide an improved articulation for a robot to obviate prior art shortcomings.

SUMMARY OF THE INVENTION

According to one aspect of the present invention, an articulation for a robot, in particular a collaborative robot, includes as components a drive, a transducer for providing information relating to a rotational speed, commutation and/or position, and a plurality of heat exchanger tubes for removing heat from the components, with a first one of the heat exchanger tubes touching a first subset of the components, and with a second one of the heat exchanger tubes touching a second subset of the components.

A heat exchanger tube is a heat carrier which, using evaporation heat of a medium, allows a high heat flux density. Due to an advantageously streamlined structural design, the heat exchanger tube is particularly suitable for the articulation, since large amounts of heat can be transported on a small cross-sectional area.

The present invention resolves prior art problems by providing the articulation with a plurality of heat exchanger tubes, wherein a first heat exchanger tube touches a first subset of the components, and wherein a second heat exchanger tube touches a second subset of the components. This embodiment depends on which components in the joint are thermally critical and which parts in the joint are stationary or rotate. The arrangement of the heat exchanger tubes should be adapted to the construction of the joint in an advantageously flexible manner.

The heat exchanger tube can be designed as a heat pipe or as a two-phase thermosiphon. Other embodiments of the heat exchanger tube are also possible. Both structural formats of the heat exchanger tube have essentially a same underlying functional principle. A particular difference lies in the return transport of a preferably gaseous working fluid to an evaporator, i.e. to a point to which the heat is supplied. In both structural formats, the return transport takes place passively and therefore without assistance from a circulation pump, for example.

In the case of a thermosiphon, use is made of gravity. In the case of a heat pipe, capillary forces ensure the return transport of the working fluid.

Heat exchanger tubes may advantageously be designed as metal vessels which have an elongated shape and contain a hermetically encapsulated volume. The heat exchanger tube may advantageously be filled with a working fluid, e.g. water or ammonia. The working fluid occupies the volume in small part in a liquid state and in large part in a gaseous state. A point in the vessel which serves to absorb energy, in particular heat, is called an evaporator. A point in the vessel which serves to release energy, in particular heat, is called a condenser. The evaporator can be situated at an and or in the middle.

According to another advantageous feature of the invention, the drive can include a dynamo-electric machine and a converter. The dynamo-electric machine can advantageously involve a dynamo-electric rotary machine, in particular a motor. The machine can advantageously involve a servomotor. However, linear motors may also be possible.

According to another advantageous feature of the invention, provision may be made for a gear as a further component. This is advantageous because high torques that are necessary can then be generated from a small structural volume. It is also conceivable for a direct drive to be present in the articulation.

According to another advantageous feature of the invention, provision may be made for a brake as a further component. This is advantageous because it allows a precise sequence of motions. The robot can also be stabilized thus in the event of a power failure. A braking effect may also be achieved by means of an irreversible gear.

According to another advantageous feature of the invention, provision may be made for an external heat sink. Advantageously, the articulation can have a plurality of external heat sinks. These are arranged at a front axial end of the articulation and at a rear axial end of the articulation, for example. However, other arrangements are possible. The external heat sink may advantageously have a surface which is enlarged, e.g. by means of a fin structure.

According to another advantageous feature of the invention, the heat exchanger tubes can each be designed to release heat into the external heat sink. For this purpose, the heat exchanger tube can advantageously be connected to the external heat sink.

According to another advantageous feature of the invention, at least one of the heat exchanger tubes can be designed as a heat pipe. This is advantageous because heat can be efficiently removed thereby. Moreover, the heat pipe only requires a small amount of structural space. A configuration as heat pipe is also advantageous because the articulation of a robot moves and therefore a position of the heat exchanger tube changes. Heat transportation always functions with the heat pipe, since a capillary effect is utilized irrespective of orientation.

According to another advantageous feature of the invention, the heat exchanger tubes can be designed to touch at least one component, preferably a plurality of components, in order to absorb heat. For this purpose, the heat exchanger tube can be arranged at a peripheral region of the component. Furthermore, the heat exchanger tube can penetrate the component.

According to another advantageous feature of the invention, the components can be arranged consecutively in an axial direction. This has the advantage that only a small amount of structural space is required. As a result, the heat exchanger tube can be arranged in an optimal manner.

According to another advantageous feature of the invention, provision may be made for two external heat sinks, with a first one of the two external heat sinks being arranged at a front axial end of the articulation, and with a second one of the two external heat sinks being arranged at a rear axial end of the articulation.

According to another aspect of the invention, a robot, in particular a collaborative robot, includes an articulation as set forth above. The robot can thus be equipped with a previously described articulation or joint. The components contained therein are cooled, preferably via heat pipes and external heat sinks.

The heat exchanger tubes, in particular heat pipes, carry the heat out from the joint in a highly conductive manner and advantageously release the heat into the externally attached heat sinks. In this case, different variations are possible in respect of a number of heat exchanger tubes, an arrangement of the heat exchanger tubes, and a design and arrangement of the heat sinks. Since the robot moves, a removal of heat via the heat sinks described above is sufficient.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
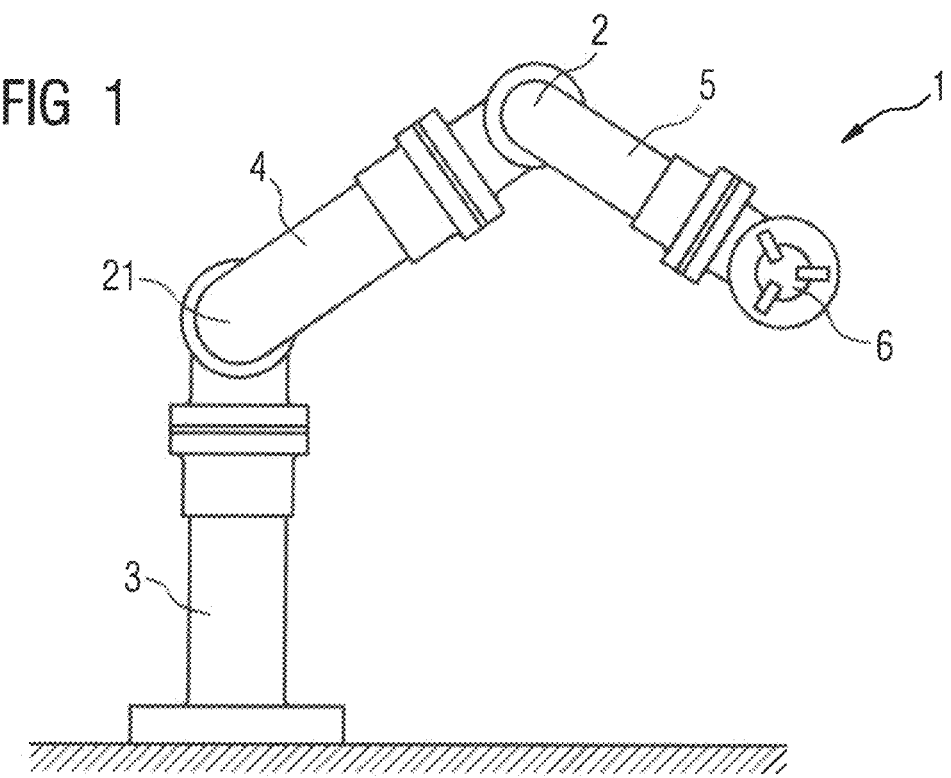
FIG. 1 shows a schematic illustration of a robot, e.g. a collaborative robot.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a robot, e.g. a collaborative robot, generally designated by reference numeral 1. The robot 1 includes a first arm member 3, a second arm member 4 and a third arm member 5. The arm members 3, 4, 5 are advantageously designed to be mobile in relation to one or more axes. For example, movement of the third arm member 5, also referred to as the lower arm, relative to the second arm member 4, also referred to as the upper arm, is achieved by means of an articulation 2.

The articulation 2 has a structure, also referred to as an articulated structure, which takes the form of a joint 7, as will be described in greater detail with reference to FIG. 2.

FIG. 1 further shows the presence of an articulation 21. The articulation 21 can likewise have the joint 7. The robot 1 also has a tool 6.

Figure 2:
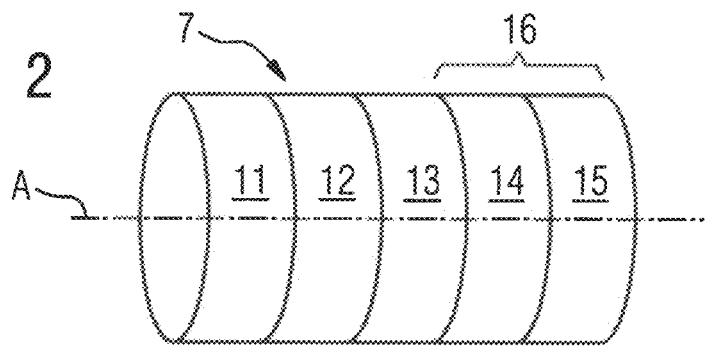
FIG. 2 shows a schematic illustration of one embodiment of a joint.

FIG. 2 shows the joint 7. The joint 7 has a plurality of components. These components include a drive 16 for moving the articulation 2 or 21, and a transducer 11 for providing information relating to rotational speed, commutation and/or position. The drive 16 advantageously has a converter 15 and a dynamo-electric machine 14, in particular a dynamo-electric rotary machine, working as a motor. The dynamo-electric rotary machine 14 is advantageously designed as a servomotor. It is therefore particularly suitable for allowing a fluid and precise movement of two arm members relative to each other. Optimal processing of workpieces by means of the tool 6 (see FIG. 1) can be achieved. The joint 7 advantageously further includes a gear 12 and a brake 13. The aforementioned components are arranged consecutively relative to an axis A.

Figure 3:
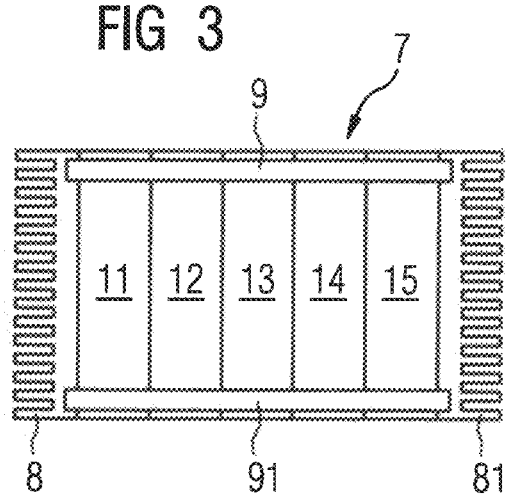
FIG. 3 shows a schematic illustration of a joint having at least one heat exchanger tube.

FIG. 3 shows the joint 7 with at least one heat exchanger tube 9, 91. By way of example, FIG. 3 shows the provision of two heat exchanger tubes 9, 91 which are arranged on sides of the joint 7, advantageously at least substantially opposite each other. This ensures an optimal removal of heat and a particularly high level of efficiency. Advantageously, the heat exchanger tube 9, 91 is designed as a heat pipe. The joint 7 also has at least one external heat sink 8, 81. This is advantageously arranged at a front or rear axial end of the joint 7. By way of example, FIG. 3 shows the provision of two external heat sinks 8, 81, with one external heat sink 8, 81 is arranged at a front axial end and one at a rear axial end of the joint 7.

The heat exchanger tube 9, 91 is designed to remove heat from the articulation 2, 21, in particular from the joint 7. The heat exchanger tube 9, 91 is moreover designed in such a way that the absorbed heat can be released into at least one external heat sink, preferably into both external heat sinks 8, 81. Advantageously, the heat exchanger tube 9, 91 is so designed as to touch at least one component, preferably a plurality of components, in order to absorb the heat.

The heat exchanger tube 9, 91 can be arranged at the peripheral regions of the components. Furthermore, the heat exchanger tube 9, 91 can also penetrate the components. It is also conceivable for the heat exchanger tube 9, 91 to be arranged centrally.

Figure 4:
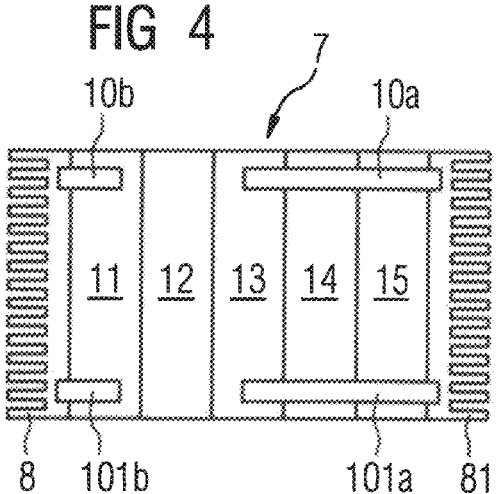
FIG. 4 shows a schematic illustration of another embodiment of a joint.

FIG. 4 shows a schematic illustration of another embodiment of a joint 7. Parts corresponding with those in FIG. 3 are denoted by identical reference numerals and not explained again. The description below will center on the differences between the embodiments. In this embodiment, provision is made for two heat exchanger tubes 10a, 10b and two heat exchanger tubes 101a, 101b. The heat exchanger tube 10a touches hereby a first subset of the components, whereas the heat exchanger tube 10b touches a second subset of the components. In this way, heat is removed in the direction of the external heat sinks 8, 81. The heat exchanger tube 101a touches also the first subset of the components and the heat exchanger tube 101b touches the second subset of the components. In this way, heat is likewise removed in the direction of the external heat sinks 8, 81.

This embodiment is advantageous because only those components which absolutely require cooling or heat removal are connected to a heat exchanger tube.

The heat exchanger tubes 10a, 10b, 101a, 101b can also touch different subsets of components.

The joint 7 advantageously has a cross section which is at least substantially circular.

The heat exchanger tubes 10a, 10b, 101a, 101b are advantageously arranged in a distributed manner around a circumference of the joint 7.

The invention is particularly suitable for use in articulations of collaborating or collaborative robots. Such robots 1 are particularly suitable for interaction with humans.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An articulation for a robot, comprising as components:
   a drive;
   a transducer for providing information relating to a rotational speed, commutation and/or position;
   a plurality of heat exchanger tubes for removing heat from the components, with a first one of the heat exchanger tubes touching a first subset of the components, and with a second one of the heat exchanger tubes touching a second subset of the components; and
   two external heat sinks, with a first one of the two external heat sinks being arranged at a front axial end of the articulation, and with a second one of the two external heat sinks being arranged at a rear axial end of the articulation.

2. The articulation of claim 1, wherein the drive includes a dynamo-electric machine and a converter.

3. The articulation of claim 1, further comprising a gear as a further component.

4. The articulation of claim 1, further comprising a brake as a further component.

5. The articulation of claim 1, wherein the heat exchanger tubes are each designed to release heat into the external heat sinks.

6. The articulation of claim 1, wherein at least one of the heat exchanger tubes is designed as a heat pipe.

7. The articulation of claim 1, wherein the heat exchanger tubes are designed to touch at least one of the components in order to absorb heat.

8. The articulation of claim 1, wherein the components are arranged consecutively in an axial direction.

9. A robot comprising an articulation, said articulation comprising as components a drive, a transducer for providing information relating to a rotational speed, commutation and/or position, and a plurality of heat exchanger tubes for removing heat from the components, with a first one of the heat exchanger tubes touching a first subset of the components, and with a second one of the heat exchanger tubes touching a second subset of the components, the articulation further comprising two external heat sinks, with a first one of the two external heat sinks being arranged at a front axial end of the articulation, and with a second one of the two external heat sinks being arranged at a rear axial end of the articulation.

10. The robot of claim 9, wherein the drive includes a dynamo-electric machine and a converter.

11. The robot of claim 9, wherein the articulation includes a gear as a further component.

12. The robot of claim 9, wherein the articulation includes a brake as a further component.

13. The robot of claim 9, wherein the heat exchanger tubes are each designed to release heat into the external heat sinks.

14. The robot of claim 9, wherein at least one of the heat exchanger tubes is designed as a heat pipe.

15. The robot of claim 9, wherein the heat exchanger tubes are designed to touch at least one of the components in order to absorb heat.

16. The robot of claim 9, wherein the components are arranged consecutively in an axial direction.

* * * * *

UNITED STATES PATENT AND TRADEMARK OFFICE
CERTIFICATE OF CORRECTION

| | |
|---|---|
| PATENT NO. | : 11,738,472 B2 |
| APPLICATION NO. | : 17/509782 |
| DATED | : August 29, 2023 |
| INVENTOR(S) | : Detlef Potoradi |

It is certified that error appears in the above-identified patent and that said Letters Patent is hereby corrected as shown below:

On the Title Page

Item [72] Inventor: replace "Saale" with --Bad Neustadt/Saale--.

Signed and Sealed this
Ninth Day of July, 2024

Katherine Kelly Vidal
*Director of the United States Patent and Trademark Office*